(12) United States Patent
Olson

(10) Patent No.: US 8,042,245 B2
(45) Date of Patent: Oct. 25, 2011

(54) REPAIR KIT FOR VEHICULAR BRAKE SLACK ADJUSTER

(76) Inventor: Terry Olson, Colby, WI (US)

( * ) Notice: Subject to any disclaimer, the term of this patent is extended or adjusted under 35 U.S.C. 154(b) by 967 days.

(21) Appl. No.: 11/968,500

(22) Filed: Jan. 2, 2008

(65) Prior Publication Data

US 2008/0164108 A1 Jul. 10, 2008

Related U.S. Application Data

(60) Provisional application No. 60/878,644, filed on Jan. 5, 2007.

(51) Int. Cl.
*B23P 6/00* (2006.01)
*B25B 27/14* (2006.01)

(52) U.S. Cl. .............. 29/402.01; 29/402.14; 29/402.15; 29/402.17; 29/271; 29/281.1; 29/281.6

(58) Field of Classification Search ............... 29/402.01, 29/402.09, 402.14, 402.15, 402.17, 270, 29/271, 274, 281.1, 281.5, 281.6; 188/196 BA, 188/79.55

See application file for complete search history.

(56) References Cited

U.S. PATENT DOCUMENTS

| | | | | |
|---|---|---|---|---|
| 4,161,240 A | * | 7/1979 | Pringle | 188/196 BA |
| 4,295,276 A | * | 10/1981 | Ellington, III | 33/644 |
| 4,484,665 A | * | 11/1984 | Svensson | 188/79.55 |
| 5,327,999 A | * | 7/1994 | Nelander | 188/79.55 |
| 5,626,210 A | * | 5/1997 | Nelander | 188/79.55 |
| 7,198,138 B2 | * | 4/2007 | Chadha et al. | 188/79.55 |
| 2011/0035919 A1 | * | 2/2011 | DeGennaro, Jr. | 29/402.01 |

* cited by examiner

*Primary Examiner* — Essama Omgba
(74) *Attorney, Agent, or Firm* — Boyle Fredrickson, S.C.

(57) ABSTRACT

A repair kit for a vehicle brake slack adjuster provides C-shaped reinforcement plates that may be clamped on opposite sides of a damaged stabilizer anchor tab to repair the same without removal of the slack adjuster.

14 Claims, 2 Drawing Sheets

REPAIR KIT FOR VEHICULAR BRAKE SLACK ADJUSTER

CROSS-REFERENCE TO RELATED APPLICATIONS

This application claims the benefit of U.S. provisional application 60/878,644 filed Jan. 5, 2007 hereby incorporated by reference.

STATEMENT REGARDING FEDERALLY SPONSORED RESEARCH OR DEVELOPMENT

Background of the Invention

The present invention relates to vehicle brake systems and in particular to a repair kit for repairing a brake slack adjuster providing automatic brake adjustment.

Vehicle brakes work by frictional contact between a rotating element attached to the vehicle wheels, for example a brake drum or brake disk, and brake pads attached to the vehicle to press against this rotating element when a brake pedal is engaged. The mechanical advantage required to ensure sufficient braking force means that the movement of the brake pads is small with respect to movement of the brake pedal. As a result, small amounts of wear in the brake pads can result in substantial changes in height of the brake pedal even to the point where the brakes may no longer be operated. Accordingly it is known to provide for automatic adjustment of the brake "slack" or spacing between the brake pads and rotating element, through use of a "slack adjuster" mechanism.

Slack adjuster mechanisms and their operation are described generally in U.S. Pat. No. 4,484,665 entitled: "Brake Adjuster"; U.S. Pat. No. 5,327,999 entitled "Brake Lever For An S-Cam Automotive Drum Brake"; and U.S. Pat. No. 5,626,210 entitled: "Control Arm Arrangement For A Brake Lever" each hereby incorporated by reference. A common type of slack adjuster includes a slack adjuster body fitting about an S-cam shaft to rotate and S-cam when a lever of the slack adjuster is moved, for example, by a hydraulic cylinder. An internal mechanism of the slack adjuster may require a stationary reference point obtained, for example, by means of an anchor tab having an orifice receiving a locator pin attached to the vehicle frame. The orifice may include a wear reducing plastic insert.

The orifice of the anchor tab may be damaged or worn by constant use and the high forces associated with the braking mechanism. As the orifice enlarges, hammering between the orifice and the locator pin may generate mechanical noise as well as accelerate the failure of the orifice thus not allowing the slack adjuster to adjust properly. In these cases, the slack adjuster must be wholly removed from the brake assembly for repair or replacement at considerable expense.

BRIEF SUMMARY OF THE INVENTION

The present invention provides a repair kit for slack adjusters that may be used when the orifice in the anchor tab of the slack adjuster has been enlarged or damaged by wear. The repair kit provides C-shaped elements that may fit about the anchor tab and locator pin without removal of the slack adjuster. Locator elements on the C-shaped elements securely engaged the anchor tab when the C-shaped elements are clamped together about the anchor tab. The present inventors have determined that the surface area and locator elements of the C-shaped elements provides a sufficient force transmission for reliable repair of these critical devices.

Specifically, the present invention provides a repair kit for a slack adjuster, the latter communicating with brake pads to provide for automatic slack adjustment of vehicular brakes, where the slack adjuster has a body fitting rotatably about a shaft and has a radially extending tab with an orifice for receiving a stationary locator pin. At the repair kit includes a first and second C-shaped element, the C-shaped elements defining a slot having a width corresponding to a width of the locator pin, each C-shaped element having opposable faces, at least one face including a locator element extending from the face to align the face with the anchor tab when the face is placed against the anchor tab. Clamp elements allows compression of the C-shaped elements together so that their faces contact corresponding opposed faces of the anchor tab with the locator element aligning the slot with the orifice.

It is thus one object of an embodiment of the invention to provide a method of repairing slack adjusters that does not require removing the slack adjuster from the locator pin and that may handle a wide variety of damaged anchor tabs by stabilization against the anchor tab face.

The locator element may be a lip fitting in part within the orifice when the C-shaped elements are clamped about the anchor tab.

It is thus an object of an embodiment of the invention to provide for resistance to movement of the C-shaped elements by positive engagement with an inner surface of the orifice.

Alternatively or in addition, the locator element may be a boss positioned outside of the anchor tab when the C-shaped elements are clamped about the anchor tab.

It is thus another object of an embodiment of the invention to provide guidance for the installation of the kit through surfaces flanking the anchor tab when the C-shaped elements are properly located.

The boss may separate the C-shaped elements when the C-shaped elements are clamped together.

It is thus an object of an embodiment of the invention to promote a parallel orientation of the C-shaped elements with respect to each other without bowing of the C-shaped elements.

The separation provided by the boss may be no greater than a thickness of the anchor tab measured in the direction of the separation when the C-shaped elements are clamped together about the anchor tab.

It is thus an object of an embodiment of the invention to ensure proper compression of the anchor tab between the C-shaped elements.

The clamp elements may be a set of machine screws received through bores in one C-shaped element and through corresponding threaded holes in the other C-shaped element so that tightening of the machine screws draws the C-shaped elements together.

It is thus an object of an embodiment of the invention to provide for a simple clamping mechanism that allows a large clamping force to be shared among multiple elements.

The width of the slot may be less than a corresponding width of the orifice.

It is thus another object of an embodiment of the invention to decrease play in the slack adjuster as may have been caused by wear or the loss of an insert.

These particular objects and advantages may apply to only some embodiments falling within the claims, and thus do not define the scope of the invention.

DETAILED DESCRIPTION OF THE INVENTION

Figure 1:
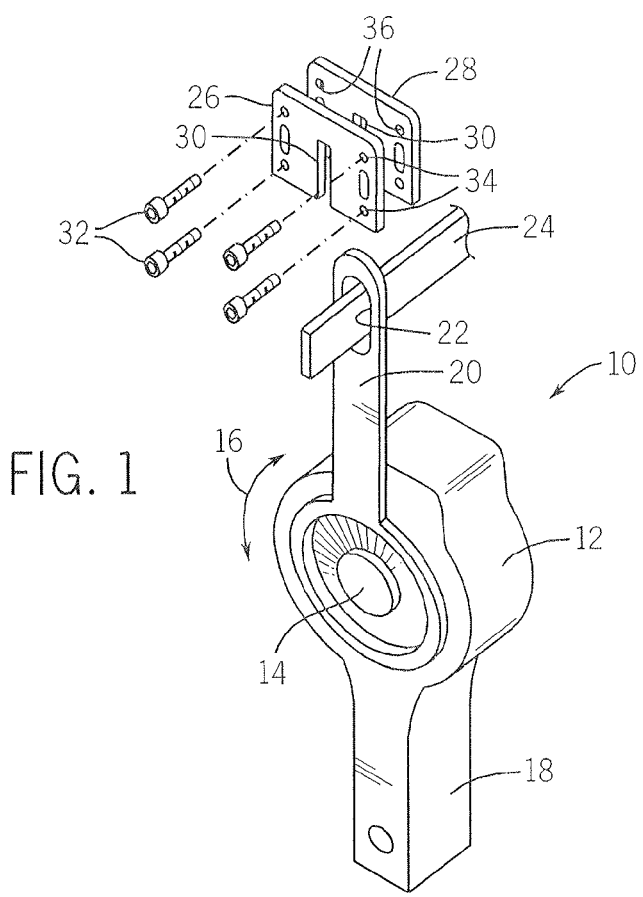
FIG. 1 is a perspective exploded view of a slack adjuster and the repair kit of the present invention showing its installation over a retaining pin without removal of the slack adjuster.

Referring now to FIG. 1, a slack adjuster 10 may have a body 12 fitting about a brake actuation shaft 14 (S-cam shaft) to rock the brake actuation shaft 14 as indicated by arrows 16. A lever portion 18 of the slack adjuster 10 may connect to a brake actuation arm (not shown) communicating with brake actuation hydraulics or air chambers.

An internal mechanism of the slack adjuster 10 described in the above referenced patents may connect to a radially extending anchor tab 20 having an orifice 22 that receives a locator pin 24, the latter typically attached to the vehicle body to maintain a stationary position. During operation of the slack adjuster 10, the orifice 22 may become enlarged or damaged.

The present invention permits the repair of the orifice 22 through the use of a first C-shaped plate 26 and second C-shaped plate 28 each having slots 30 extending upward part way through the plates 26 and 28 along a vertical (as shown) centerline through the plates 26 and 28. The slots 30 allow the C-shaped plates 26 and 28 to be fit over the locator pin 24 on either side of the anchor tab 20 while the slack adjuster 10 is installed with the anchor tab 20 on the locator pin 24.

A set of machine screws 32 may then pass through bores 34 in a front most C-shaped plate 26 to have their threaded shanks 40 received by tapped holes 36 in the rearmost C-shaped plate 28 clamping the plates 26 and 28 with their broad faces against corresponding broad faces of the anchor tab 20 with the slots 30 engaging the locator pin 24. The machine screws 32, when tightened in tapped holes 36, pull C-shaped plate 26 toward C-shaped plate 28 the former as captured under the heads of the machine screws 32 resting outside of the bores 34.

Figure 2:
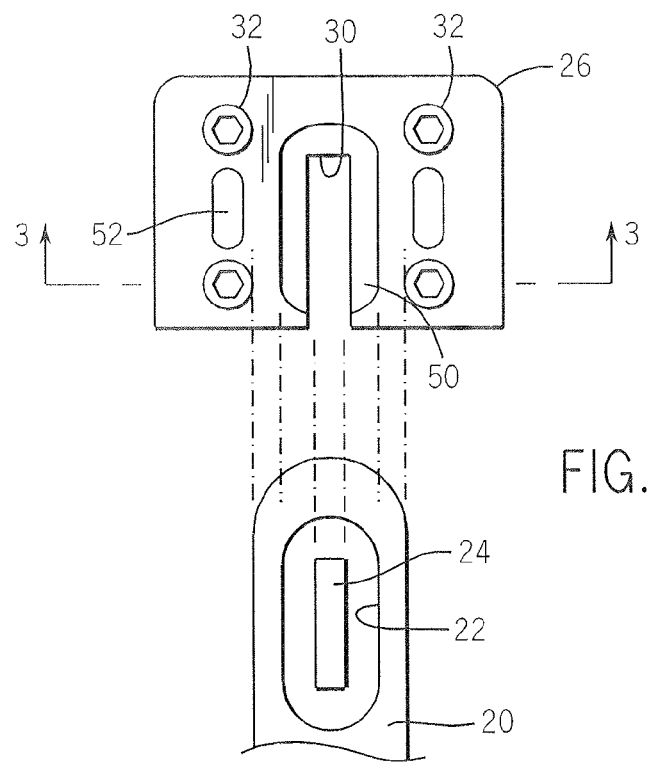
FIG. 2 is a front elevation of view of the slack adjuster anchor tab and one C-shaped element of the present invention showing corresponding dimensions of each.

Referring now to FIG. 2, the slot 30 has a width that corresponds (i.e. is approximately the same width) as the width of the anchor tab 20 and smaller than a width of the orifice 22. In this way the C-shaped plates 26 and 28 absorb the circumferential force of the locator pin 24 against the slack adjuster 10 communicating that force over a broad area to the anchor tab 20.

Figure 3:
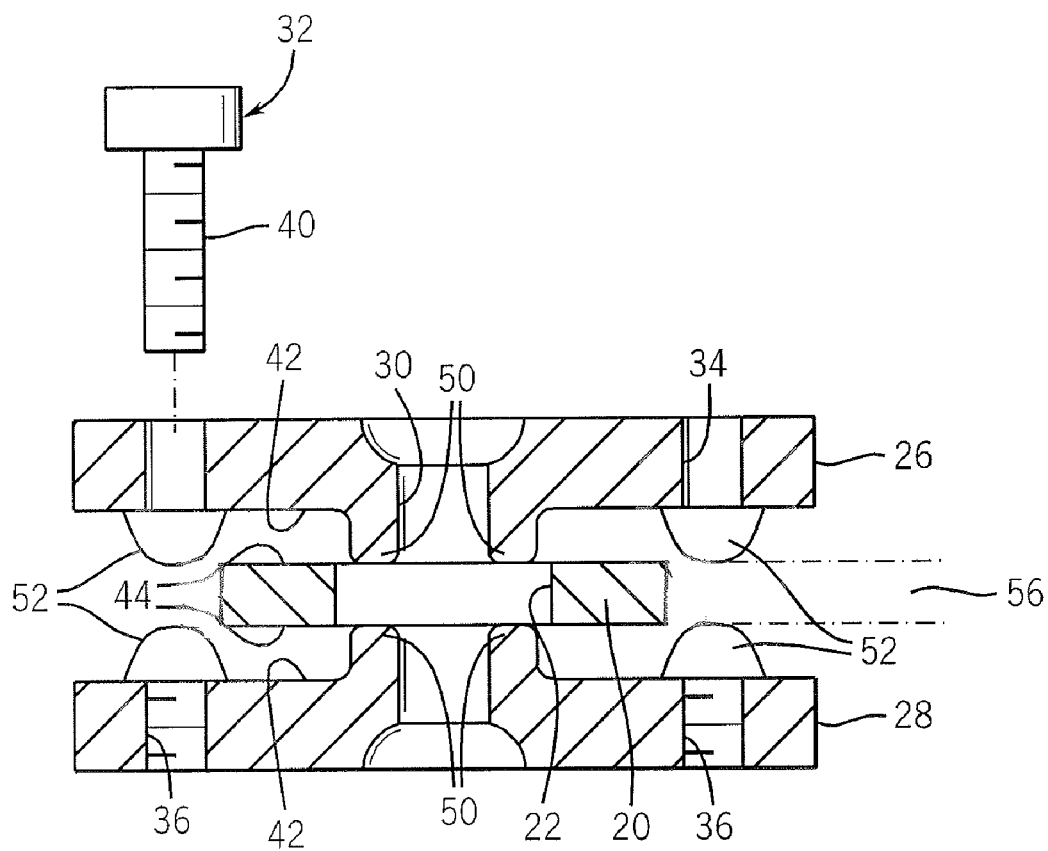
FIG. 3 is a cross-sectional view a long line 3-3 of FIG. 2 showing locator elements for positioning the C-shaped elements about the anchor tab.

Referring now to FIGS. 2 and 3, each C-shaped plate 26 and 28 may be substantially identical except for the bores 34 (which are sized to pass thread threaded shanks 40 of the machine screws 32) and a tapped holes 36 (which are sized to receive the threaded shanks 40 in engagement). In this way, tooling costs may be reduced.

Each of the C-shaped plates 26 and 28 has an inner face 42 that may abut corresponding broad faces 44 of the anchor tab 20 when the C-shaped plates 26 and 28 are clamped by the machine screws 32 to engage the same.

To assist in the retention and initial placement of the C-shaped plates 26 and 28 on the anchor tab 20, the inner faces 42 may have locator elements extending inward from the inner faces 42 including lips 50 positioned about the slot 30 and sized to engage inner edges of the orifice 22, and bosses 52 positioned between vertically opposed pairs of the bores 34 and tapped holes 36, the bosses 52 abutting each other when the C-shaped plates 26 and 28 are clamped together about the anchor tab 20.

Generally the bosses 52 extend inward from the inner faces 42 further than the lips 50 and thus hold the plates 26 and 28 in separation by an amount only slightly smaller than the thickness 56 of the anchor tab 20. Thus, for example, the thickness of the anchor tab 20 may be 0.125 inches and the separation established by the bosses 52 may be 0.116 inches. In this way, the bosses 52 limit warping of the plates 26 and 28 under pressure by the machine screws 32. The bosses 52 also abut outer edges of anchor tab 20, thus allowing tighter engagement and rigidity.

The bosses 52 and lips 50 may be formed by a stamping metal plates 26 and 28 to deform them locally according to methods well known in the art.

The C-shaped plates 26 and 28 not only reinforce the existing orifice 22 but increase the surface area or contact area with the locator pin 24 from approximately ⅛" to ½".

It is specifically intended that the present invention not be limited to the embodiments and illustrations contained herein and the claims should be understood to include modified forms of those embodiments including portions of the embodiments and combinations of elements of different embodiments as come within the scope of the following claims.

I claim:

1. A repair kit for a slack adjuster communicating with brake pads to provide for automatic slack adjustment of vehicular brakes, the slack adjuster being of a type having a body fitting about a rotatable brake actuation shaft, the slack adjuster having a radially extending anchor tab with an orifice for receiving a stationary locator pin, the repair kit comprising:

first and second plate elements, the plate elements each defining a slot having a width corresponding to a width of the locator pin, each plate element having opposable faces, at least one face including a locator element extending from the face to align the face with the anchor tab when the face is placed against the anchor tab, wherein at least one plate element is C-shaped such that the defined slot is open; and clamp elements allowing compression of the plate elements together so that their faces contact corresponding opposed faces of the anchor tab with the locator element aligning the slot with the orifice;

whereby the plate elements are configured to be installed on either side of the anchor tab without removing the slack adjuster from the locator pin and when clamped onto the anchor tab receive force from the locator pin to reinforce the anchor tab.

2. The repair kit of claim 1 wherein the locator element is a lip fitting in part within the orifice when the plate elements are clamped about the anchor tab.

3. The repair kit of claim 1 wherein the locator element is a boss positioned outside of the anchor tab when the plate elements are clamped about the anchor tab.

4. The repair kit of claim 3 wherein the boss separates the plate elements when the plate elements are clamped together.

5. The repair kit of claim 4 wherein the separation provided by the boss is no greater than a thickness of the anchor tab majored in a direction of the separation when the plate elements are clamped together about the anchor tab.

6. The repair kit of claim 1 wherein the clamp elements are a set of machine screws received through bores in one plate element and through corresponding threaded holes in the other plate element so that tightening of the machine screws draws the plate elements together.

7. The repair kit of claim 1 wherein in a width of the slot is less than a corresponding width of the orifice.

8. A method of repairing a slack adjuster actuating brake pads to provide for automatic slack adjustment of vehicular brakes, the slack adjuster being of a type having a body supported by a rotatable shaft actuating the brakes, the slack adjuster having a radially extending anchor tab with an orifice for receiving a locator pin extending generally parallel to the shaft, the method comprising the steps of:
(a) without removing the slack adjuster anchor tab from the locator pin, fitting first and second plate elements about the anchor tab and locator pin, at least one plate element being C-shaped to slide onto the locator pin behind the anchor tab, each plate element having a slot having a width corresponding to a width of the locator pin, each plate element having opposable faces, at least one face including a locator element extending from the face to align the face with the anchor tab when the face is placed against the anchor tab; and
(b) clamping the first and second plate elements together so that their faces contact corresponding opposed faces of the anchor tab with the locator element aligning the slot with the orifice;
whereby the plate elements are installed on either side of the anchor tab without removing the slack adjuster from the locator pin and are clamped onto the anchor tab thereby receiving force from the locator pin to reinforce the anchor tab.

9. The method of claim 8 wherein the locator element is a lip fitting in part within the orifice when the plate elements are clamped about the anchor tab.

10. The method of claim 8 wherein the locator element is a boss positioned outside of the anchor tab when the plate elements are clamped about the anchor tab.

11. The method of claim 10 wherein in the boss separates the plate elements when the plate elements are clamped together.

12. The method of claim 11 wherein the separation provided by the boss is no greater than a thickness of the anchor tab measured in a direction of the separation when the plate elements are clamped together about the anchor tab.

13. The method of claim 8 wherein the clamping is done with a set of machine screws received through bores in one plate element and through corresponding threaded holes in the other plate element so that tightening of the machine screws draws the plate elements together.

14. The method of claim 8 wherein a width of the slot is less than a corresponding width of the orifice.

\* \* \* \* \*